(12) United States Patent
Ceccaroli et al.

(10) Patent No.: US 12,059,018 B2
(45) Date of Patent: Aug. 13, 2024

(54) ROASTING APPARATUS

(71) Applicant: SOCIETE DES PRODUITS NESTLE S.A., Vevey (CH)

(72) Inventors: Stefano Ceccaroli, Chavornay (CH); Sandrine Jaccard, Ste-Croix (CH); Flavien Dubief, Champagne (CH); Paul Gurevitch-Beacock, Staffordshire (GB); Stuart Brigante, West Midlands (GB)

(73) Assignee: Societe des Produits Nestle S.A., Vevey (CH)

( * ) Notice: Subject to any disclaimer, the term of this patent is extended or adjusted under 35 U.S.C. 154(b) by 580 days.

(21) Appl. No.: 17/425,464

(22) PCT Filed: Jan. 20, 2020

(86) PCT No.: PCT/EP2020/051307
§ 371 (c)(1),
(2) Date: Jul. 23, 2021

(87) PCT Pub. No.: WO2020/152114
PCT Pub. Date: Jul. 30, 2020

(65) Prior Publication Data
US 2022/0095668 A1  Mar. 31, 2022

(30) Foreign Application Priority Data

Jan. 25, 2019 (EP) .................................... 19153660

(51) Int. Cl.
*A23N 12/12* (2006.01)
*H05B 3/22* (2006.01)

(52) U.S. Cl.
CPC ............. *A23N 12/125* (2013.01); *H05B 3/22* (2013.01)

(58) Field of Classification Search
CPC ....... A23F 5/046; A23N 12/08; A23N 12/125; H05B 3/22
(Continued)

(56) References Cited

U.S. PATENT DOCUMENTS 5,564,331 A   10/1996  Song
5,749,288 A *  5/1998  Skaling ................. A23N 12/10
                                                        99/286

(Continued)

FOREIGN PATENT DOCUMENTS

CN     101309622 A    11/2008
CN     105410960 A     3/2016
(Continued)

OTHER PUBLICATIONS

Office Action Received for Chinese Patent Application No. 202080013467.3, mailed on Nov. 22, 2022, 9 Pages (6 Pages of English translation and 3 Pages of Official Copy).
(Continued)

*Primary Examiner* — Dana Ross
*Assistant Examiner* — James F Sims, III
(74) *Attorney, Agent, or Firm* — K&L Gates LLP

(57) ABSTRACT

The invention concerns an apparatus (10) for roasting coffee beans comprising:—a housing (4),—a roasting chamber (1) presenting a bottom opening (11),—an air driver (2) configured to drive air inside the roasting chamber through the bottom opening of said chamber,—an electrical heater (3) positioned below the bottom opening of the roasting chamber, said electrical heater being configured to heat air driven inside the roasting chamber,—the air driver and the electrical heater being positioned inside the housing (4) and the housing comprising a hot air outlet hole (41) designed to enable the passage of hot air from the housing inside the bottom opening (11) of the roasting chamber, and the
(Continued)

Figure 1:
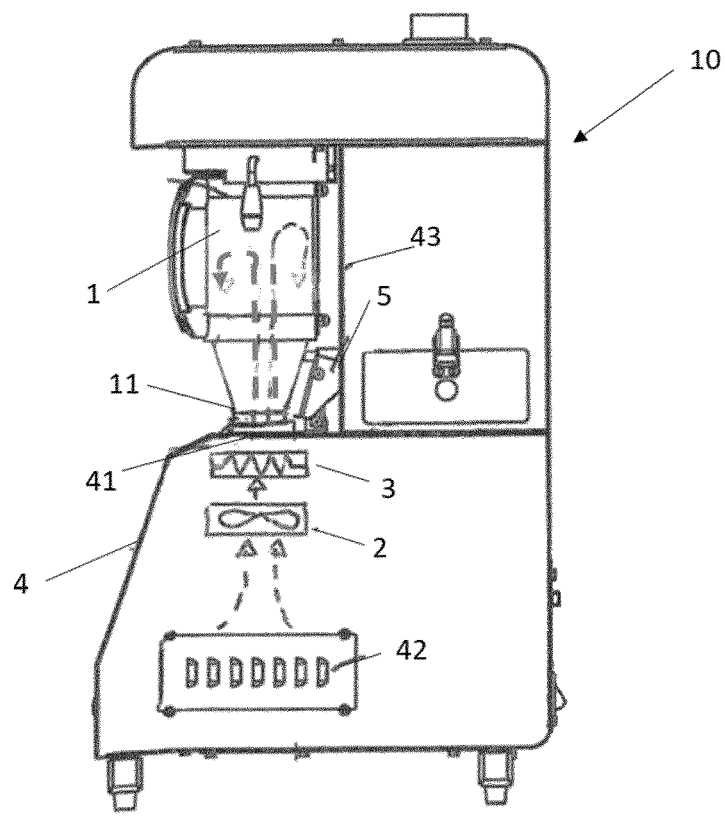

electrical heater (3) being positioned just below the hot air outlet hole (41),—the roasting chamber (1) being removably mounted to the housing (4), the bottom opening (11) of the roasting chamber cooperating with the hot air outlet hole (41) of the housing when the roasting chamber is mounted to the housing, wherein the apparatus comprises a movable closure device (5) configured:—to cover the hot air outlet hole (41) while the roasting chamber is being removed from the housing, and - to uncover the hot air outlet hole (41) while the roasting chamber is being mounted to the housing.

9 Claims, 3 Drawing Sheets

(58) Field of Classification Search
USPC .......................................................... 99/337
See application file for complete search history.

(56) References Cited

U.S. PATENT DOCUMENTS

| 5,996,480 | A | * | 12/1999 | Kelley | ................... A23N 12/08 |
| | | | | | 99/286 |
| 6,260,479 | B1 | | 7/2001 | Friedrich et al. | |
| 2004/0105922 | A1 | | 6/2004 | Moon et al. | |

FOREIGN PATENT DOCUMENTS

| DE | 1009466 | | 5/1957 |
| DE | 3636999 | | 5/1988 |
| DE | 102006003267 | | 7/2007 |
| JP | S57110146 | A | 7/1982 |
| JP | S58193650 | A | 11/1983 |
| JP | 2018088908 | A | 6/2018 |
| KR | 20140109614 | A | 9/2014 |
| RU | 2328129 | C1 | 7/2008 |
| TW | M299476 | U | 10/2006 |
| TW | M476479 | U | 4/2014 |
| WO | 0066961 | | 11/2000 |

OTHER PUBLICATIONS

Decision of Grant for Russian Appl No. 2021124519/10 dated May 16, 2023.
Chinese Office Action for Appl No. 2021-543203 dated Sep. 26, 2023.

* cited by examiner

ROASTING APPARATUS

CROSS REFERENCE TO RELATED APPLICATIONS

The present application is a National Stage of International Application No. PCT/EP2020/051307, filed on Jan. 20, 2020. which claims priority to European Patent Application No. 19153660.6, filed on Jan. 25, 2019, the entire contents of which are being incorporated herein by reference.

FIELD OF THE INVENTION

The present invention relates to apparatus for roasting coffee beans with heated air and particularly suited for use in the home or in shops and cafes.

BACKGROUND OF THE INVENTION

Roasting of coffee beans at small scale that is at home or in shops and cafes is usually implemented with small sized apparatuses wherein coffee beans are agitated inside hot air. One type of apparatus uses a rotating perforated drum wherein coffee beans are introduced and tumbled while heat is supplied.

Another type of apparatus uses fluidized bed technology implementing a hot air fluid bed chamber. Within such a chamber, heated air is forced through a screen or a perforated plate under the coffee beans with sufficient force to lift the beans. Heat is transferred to the beans as they tumble and circulate within this fluidized bed.

Derived from an industrial roaster described in U.S. Pat. No. 3,964,175, this technology has been adapted in small domestic devices like U.S. Pat. Nos. 4,484,064, 4,494,314, 4,631,838, 5,269,072, 5,564,331.

In roasting apparatuses, different types of heater can be used like a gas burner or an electrical heater. For small sized roasters, usually electrical heaters are preferred such as a heating resistance.

Most of the roasters implementing fluidized bed technology present the same configuration of the key elements that are the roasting chamber, the heater and the air driver. Quite commonly and obviously, these elements are placed one above the other along a vertical axis, with the air driver positioned at the lowest position, the electrical resistance above and the roasting chamber above the resistance.

Preferably, in these roasters, the hot air fluid bed chamber is removable from the apparatus in order to introduce and remove the beans as well as for cleaning operations. While the chamber is being removed from the apparatus and depending on the design of the apparatus, a security issue may rise if a non-experimented user drops accidentally water inside the apparatus.

An object of the present invention is to provide a roasting apparatus with a higher level of security.

SUMMARY OF THE INVENTION

In a first aspect of the invention, there is provided an apparatus for roasting coffee beans comprising:
a housing,
a roasting chamber presenting a bottom opening,
an air driver configured to drive air inside the roasting chamber through the bottom opening of said chamber,
an electrical heater positioned below the bottom opening of the chamber configured to heat air driven inside the roasting chamber,
the air driver and the electrical heater being positioned inside the housing and the housing comprising a hot air outlet hole designed to enable the passage of hot air from the housing inside the bottom opening of the chamber,
the roasting chamber being removably mounted to the housing, the bottom opening of the roasting chamber cooperating with the hot air outlet hole of the housing when the roasting chamber is mounted to the housing,
wherein the apparatus comprises a movable closure device configured:
to cover the hot air outlet hole while the roasting chamber is being removed from the housing, and
to uncover the hot air outlet hole while the roasting chamber is being mounted to the housing.

The roasting apparatus comprises a roasting chamber presenting a bottom opening and usually a top opening. This roasting chamber is designed to enable the production of a fluidized bed of hot air when hot air is introduced through the bottom opening.

Generally the bottom opening comprises a grid to hold the beans inside the chamber but enabling the passage of hot air therethrough.

The top opening enables the evacuation of smokes and particles generated during the roasting operation. It also enables the introduction of beans to be roasted and the removal of roasted beans at the end of the roasting operation. For these last operations, the roasting chamber is removable from the housing of the apparatus.

The apparatus comprises an air driver configured to drive air inside the roasting chamber through the bottom opening of said chamber. Usually, this air driver is an air blower or a fan designed to blow air upwardly to the roasting chamber.

The apparatus comprises an electrical heater positioned below the bottom opening of the chamber and configured to heat air before it is introduced inside the roasting chamber. This electrical heater is preferably an electrical resistance wire. This resistance wire can be mounted on a non-conductive support, made for example of a ceramic material. The support can be designed to create channels for air in order to increase and facilitate heat exchange. The air driver and the electrical heater are positioned inside the housing. The housing comprises a hot air outlet hole designed to enable the passage of hot air generated inside the housing to the bottom opening of the chamber.

As mentioned above, the roasting chamber is removably mounted to the housing. When the roasting chamber is mounted to the housing, the bottom opening of the roasting chamber cooperates with the hot air outlet hole of the housing.

Generally the heater is positioned just below the hot air outlet hole of the housing in order to limit loss of heat during the movement of hot air from the heater to the roasting chamber. This position of the heater provides a good temperature regulation during the roasting process in the roasting chamber too: actually any temperature change of the heater immediately impacts the temperature inside the roasting chamber.

In addition, the apparatus comprises a movable closure device configured to:
to cover the hot air outlet hole while the roasting chamber is being removed from the housing, and
to uncover the hot air outlet hole while the roasting chamber is being mounted to the housing.

Consequently, when the chamber is removed from the housing of the roasting apparatus, the hot air outlet hole is covered and the heater positioned just under the hot air outlet hole is protected by the closure device. In case the user accidentally throws water in the area of the housing designed to receive the chamber—for example, during a cleaning operation of the housing where the chamber has been removed from the apparatus—then the closure device, that covers the hole, prevents water from contacting the electrical heater positioned just below the hot air outlet hole. Without this protection, water can wet the electrical resistance and, once voltage is switched on again, electrical failure, electrical hazard to operator or risk of fire may happen.

Preferably, the movement of the roasting chamber and the movement of the closure device happen simultaneously.

In one embodiment, the movements of the closure device are passively mechanically actuated by the movement of removing the roasting chamber from the housing and by the movement of mounting the roasting chamber to the housing.

Accordingly, it is the movement of the roasting chamber, either removal or connection to the housing, that urges the movement of the closure device, either covering the hole or uncovering the hole respectively.

According to that embodiment, the closure device can comprise a sliding plate able to slide above and away from the hot air outlet hole, and said plate is designed to interface with a part of the bottom of the roasting chamber. Thanks to this interface between the plate and the roasting chamber, the plate reacts immediately to the cooperation with the bottom part of the chamber.

In one mode of this embodiment, the sliding plate is made of one single piece of material and is able to rotate or translate.

Accordingly, the plate can rotate or translate away from the hot air outlet hole.

In case of translation, the plate can be guided to slide inside a slot or can be guided through side rails. The movement of the chamber in or out the apparatus is sufficient to push or draw, or release, the sliding plate, like a drawer.

In case of rotation, the plate can be connected to a vertical rotation shaft. The movement of the chamber in or out the apparatus is sufficient to rotate, or release, the rotating plate. Preferably the plate can comprise a design to interface with a part of the bottom of the chamber so that the movement of the chamber is easily transformed in a rotation of the plate by the user and facilitating the mounting of the chamber by the user. Consequently, the movement of the closure device is triggered by the movement of the roasting chamber.

In another mode of the above embodiment, the sliding plate can be made of several articulated pieces.

As a consequence, the closure device does not cover a lot of place when it is retracted or pushed apart the hole of the hot air outlet. The apparatus can be more compact. The movement can be more reliable too.

The closure device can comprise two plates articulated through a knee joint.

Alternatively, the closure device can comprise several plates sliding one above the others, like a fan.

Preferably the closure device can comprise a biasing element configured to urge the closure device to cover the hot air outlet hole while the roasting chamber is being removed from the housing. Consequently, covering can happen more rapidly.

In a particular embodiment, the closure device can be made of a deformable material, this material being bended when pushed by the chamber. Such a deformable material can be a flexible high temperature resistant silicone. This material can be shaped to close the hot air outlet hole at rest and to become compressed when pushed away from said hole by the roasting chamber when said chamber is positioned inside the housing.

According to one embodiment the closure device can be motorized and automatically moved to cover the air outlet hole. In that embodiment preferably, the apparatus can comprise a chamber position sensor configured to detect if the chamber is mounted to the housing or is close to the housing.

The sensor can be a presence switch, said sensor being hold by the housing of the apparatus and being configured to be contacted by the chamber when the chamber is positioned inside the apparatus.

The sensor can be an optical sensor, said sensor being hold by the housing of the apparatus and configured to detect the movement of the chamber to or from the housing.

The sensor can be a near filed detection system like a system of an RFID tag hold by the chamber and an RFID detector hold by the housing of the apparatus.

Generally, the closure device is made of a high temperature resistant material, preferably resisting 300° C. Metal is preferred.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

DETAILED DESCRIPTION OF THE DRAWINGS

Figure 2:
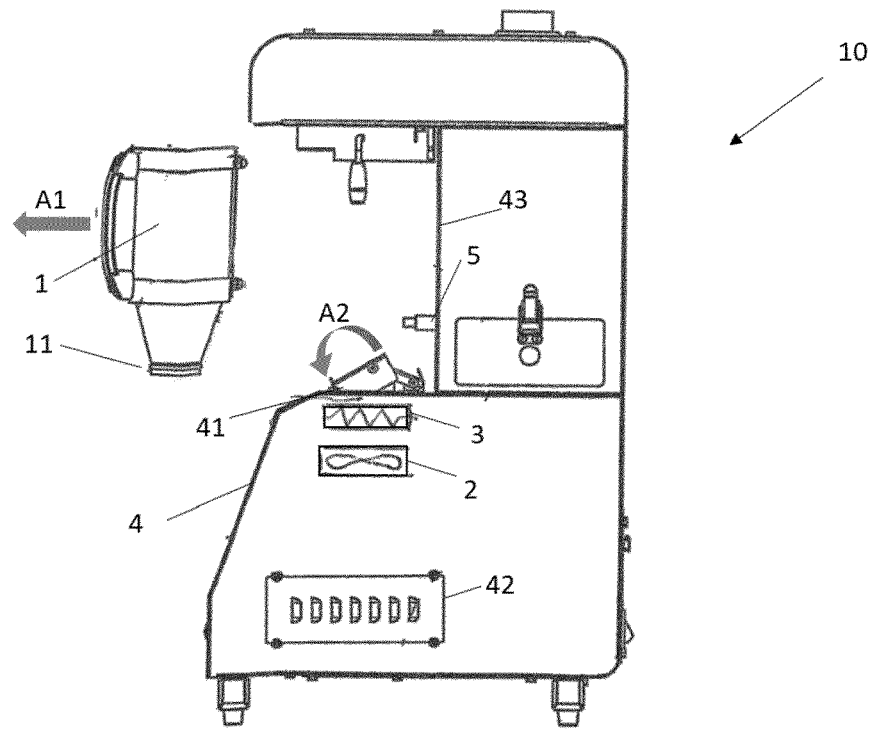
Figure 3:
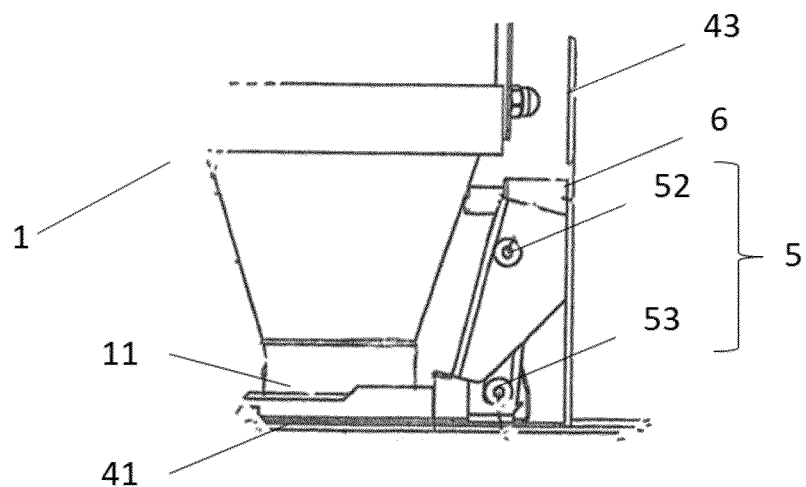
Figure 4:
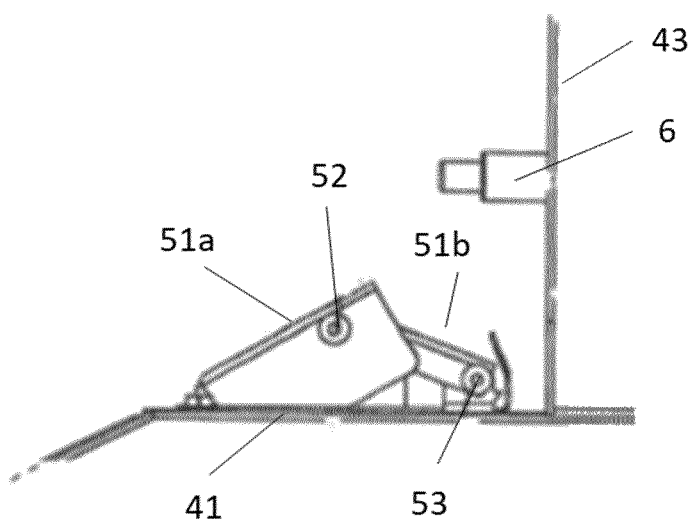
Figure 5A:
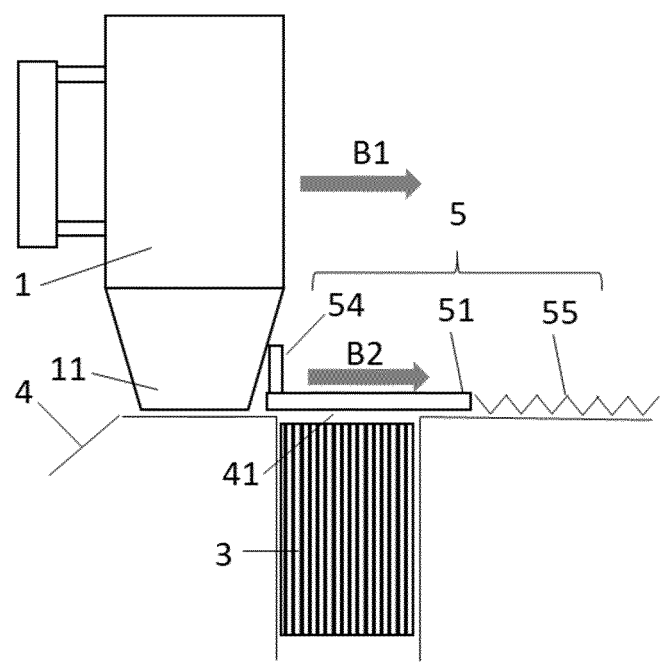
Figure 5B:
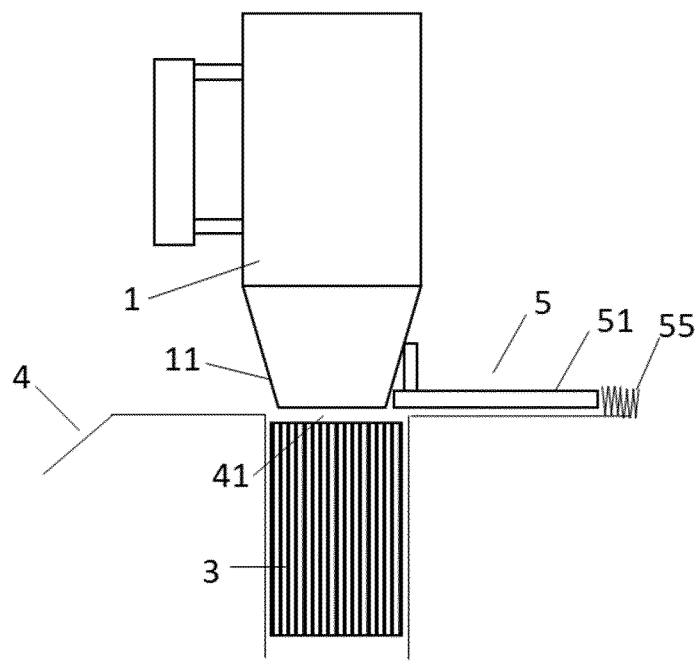

FIG. 1 illustrates a side view of a roasting apparatus according to the invention with the roasting chamber mounted to the apparatus, FIG. 2 illustrates a side view of the roasting apparatus of FIG. 1 with the roasting chamber removed therefrom and put aside, FIGS. 3 and 4 are magnified views of the closure device in FIGS. 1 and 2 respectively, FIGS. 5A and 5B are schematic views of a roasting chamber and a closure device moving in translation, FIG. 1 is a side view of a roasting apparatus 10 according to the invention. The apparatus comprises a housing 4 in which an air driver 2 and an air heater 3 are positioned. The air driver 2 is a fan sucking air from an air inlet 42 of the housing and driving air upwardly to the heater 3 and then to an air outlet hole 41 inside the chamber as illustrated by dotted lines. The heater 3 is an electrical heater, generally a resistance wire configured to heat the flow of air to a temperature comprised between 100 and 300° C. The heater is supplied with high electrical power for example at about 110V or 230V. Any water in contact with the resistance creates a short circuit and failure of the apparatus. The heater 3 is positioned just below the air outlet hole 41, generally by about 1 to 5 cm, for a better control of the heating and to avoid heat loss. By "just below", it is meant that the hot air outlet hole faces the electrical heater. As a result the electric resistance is directly under the hole 41; a grid can be present to prevent the user from touching the resistance or avoid the fall of an object on the heater. The roasting apparatus comprises a roasting chamber 1 designed to hold coffee beans and to create a fluid bed of air from the hot air flow introduced through its opened bottom 11. The bottom opening 11 comprises a grid to retain coffee beans (not illustrated). When the chamber is mounted to the housing, the bottom of the chamber is tightly connected to the air outlet hole 41 to avoid hot air flow leaks.

The top opening 12 of the chamber is connected to a smoke and particulates evacuation device (not illustrated).

The chamber 1 is removable from the housing 4 as illustrated by the arrow in FIG. 2. The chamber can be put aside the roasting apparatus either for introduction or removal of coffee beans or for cleaning and maintenance. When the chamber is removed, the operator gets access to the vertical housing part 43 behind the chamber and is able to clean it, for example with a sponge and water. During that cleaning operation, there is a risk that water, even drops, may fall in direction of the air outlet hole 41 and consequently on the heater.

The apparatus comprises a movable closure device 5 cooperating with the roasting chamber 1 and able to close the air outlet hole 41 when the chamber is removed from the apparatus. In FIG. 1, and in the magnified view of FIG. 3, where the chamber is mounted to the housing of the apparatus, the closure device 5 is pushed and retained aside the air outlet hole 41 by a bottom part of the roasting chamber and hold against the vertical wall 43 of the housing; the connection of the bottom opening 11 of the chamber with the air outlet hole 41 is realised.

In FIG. 2 and in the magnified view of FIG. 4, the chamber has been removed from the housing of the apparatus by translation to the left as illustrated by the arrow A1. As a result, the closure device 5 is not pushed back any longer and is able to fall above the air outlet hole 41 to cover it as illustrated by arrow A2. In that position, any water or other liquid, falling in direction of the air outlet hole 41 is directed to the horizontal wall of the housing surrounding the air outlet hole and does not reach said hole. As a consequence, the below electrical heater 3 is protected from any future short circuit.

In the embodiment illustrated in FIGS. 1 to 4, the closure device comprises two articulated plates 51a, 51b. The two plates are joined one to the other by a knee joint 52. Plate 51b is able to rotate around a fixed axis 53, this fixed axis extending horizontally and perpendicularly to the sliding direction of the plates 51a, 51b.

In FIGS. 1 and 3, the bottom part of the chamber maintains these plates 51a, 51b in a bended position along the vertical of the housing. In FIGS. 2 and 4, the removal of the chamber frees the closure device 5: due to its weight and its angle, the plate 51a falls from its vertical position and pulls the other plate 51b attached to the first plate by the knee joint 52. As a result, the two plates cover the air outlet hole.

Preferably the interaction between different pieces of the closure device and the interaction of the plates with the housing are configured to be free of friction as much as possible in order to enable an easy handling of the chamber for the user and an efficient and rapid extension or bending movement of the plates.

The illustrated embodiment shows the presence of a position sensor 6 for detecting the position of the chamber inside the apparatus or removed therefrom. Information about the presence of the chamber can be used to disconnect the apparatus from power or to provide specific information on a user interface.

If the closure device is motorized, the sensor is helpful to automatically move the closure device when the sensor detects the absence of the chamber.

FIGS. 5A and 5B are lateral side views a roasting chamber 1 and a closure device 5 illustrating their relative positions and movements when the chamber is moved in and out of the housing 4 of the apparatus.

In this embodiment, the closure device 5 comprises:
a plate 51 presenting a surface sufficient to cover the air outlet hole 41 when the chamber 1 is removed from the housing, and
an interface element 54 rising from the plate 51 and configured to interact with the bottom part 11 of the chamber when the chamber is housed or is being moved to be housed inside the apparatus,
preferably, a guiding frame (not illustrated) to guide in translation the plate 51 in response to the movement of the chamber 1 against the interface element 54,
preferably, a biasing element 55 to force the plate to slide in translation above the hole 41 when the chamber does not exert any force against the interface element 54.

Accordingly, when the chamber 1 has been removed from the housing 4, the closure device 5 is pushed by the biasing element 55 above the hole 41 and protects the heater 3 (FIG. 5A). When the chamber is introduced back inside the housing as illustrated by arrow B1 in FIG. 5A, the bottom of the chamber cooperates with the interface element 54, for example by presenting a shape fitting with the shape of the chamber, and the translation of the chamber along arrow B1 induces the same translation of the interface element 54 illustrated by arrow B2; as a result, the plate 51 is pressed against the biasing element 55. Once the chamber is correctly positioned inside the housing (FIG. 5B), the plate 51 has been totally removed from the hole 41 and the biasing element 55 is compressed and ready to push back the plate 51 when the chamber is removed from the apparatus.

In an alternative way, the translation movement of the closure device can be a rotation, the plate 51 rotating horizontally aside the hole 41.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 10
roasting chamber 1
bottom opening 11
top opening 12
air driver 2
heater 3
housing 4
air outlet hole 41
air inlet 42
vertical housing part 43
closure device 5
plate 51, 51a, 51b
knee joint 52
axis 53
interface element 54
biasing element 55
position sensor 6

The invention claimed is:

1. Apparatus for roasting coffee beans comprising:
a housing,
a roasting chamber comprising a bottom opening,
an air driver configured to drive air inside the roasting chamber through the bottom opening of the chamber,
an electrical heater positioned below the bottom opening of the chamber, the electrical heater being configured to heat air driven inside the roasting chamber,
the air driver and the electrical heater being positioned inside the housing and the housing comprising a hot air outlet hole designed to enable the passage of hot air from the housing inside the bottom opening of the chamber, and the electrical heater being positioned just below the hot air outlet hole,
the roasting chamber being removably mounted to the housing, the bottom opening of the roasting chamber cooperating with the hot air outlet hole of the housing when the roasting chamber is mounted to the housing,
wherein the apparatus comprises a movable closure device configured:
to cover the hot air outlet hole while the roasting chamber is being removed from the housing, and
to uncover the hot air outlet hole while the roasting chamber is being mounted to the housing.

2. The apparatus according to claim 1 wherein the movements of the movable closure device are passively mechanically actuated by the movement of removing the roasting chamber from the housing and by the movement of mounting the roasting chamber to the housing.

3. The apparatus according to claim 1, wherein the closure device comprises a sliding plate able to slide above and away from the hot air outlet hole, and the plate is designed to interface with a part of the bottom of the roasting chamber.

4. The apparatus according to claim 3, wherein the sliding plate is made of one single piece of material and is able to rotate or translate.

5. The apparatus according to claim 3, wherein the sliding plate is made of several articulated pieces.

6. The apparatus according to claim 1, wherein the closure device comprises a biasing element configured to urge the closure device to cover the hot air outlet hole while the roasting chamber is being removed from the housing.

7. The apparatus according to claim 1, wherein the closure device is made of a deformable material.

8. The apparatus according to claim 1, wherein the closure device is motorized and is automatically moved to cover the air outlet hole.

9. The apparatus according to claim 1, wherein the apparatus comprises a chamber position sensor configured to detect if the chamber is mounted to the housing.

* * * * *